US012625361B2

(12) United States Patent
Liu et al.

(10) Patent No.: US 12,625,361 B2
(45) Date of Patent: May 12, 2026

(54) IMAGE DISPLAY DEVICE

(71) Applicant: HTC Corporation, Taoyuan City (TW)

(72) Inventors: Kuei-Chun Liu, Taoyuan City (TW); Wei Chun Chen, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 321 days.

(21) Appl. No.: 18/466,842

(22) Filed: Sep. 14, 2023

(65) Prior Publication Data

US 2025/0093638 A1    Mar. 20, 2025

(51) Int. Cl.
| | |
|---|---|
| *G02B 25/00* | (2006.01) |
| *G02B 3/00* | (2006.01) |
| *G02B 17/08* | (2006.01) |

(52) U.S. Cl.
CPC ......... *G02B 25/001* (2013.01); *G02B 3/0037* (2013.01); *G02B 17/08* (2013.01)

(58) Field of Classification Search
CPC .............. G02B 27/0101; G02B 3/0037; G02B 2027/0123; G02B 27/0172; G02B 27/1066
See application file for complete search history.

(56) References Cited

U.S. PATENT DOCUMENTS

2022/0082835 A1* 3/2022 Yonezawa ............ G02B 27/106

* cited by examiner

*Primary Examiner* — James C. Jones
(74) *Attorney, Agent, or Firm* — JCIPRNET

(57) ABSTRACT

An image display device including a first optical element, multiple microlens arrays and a second optical element is provided. The first optical element receives a display image and generates multiple image beams parallel to each other. The microlens arrays respectively receive the image beams, deflect the image beams to generate multiple first light beams, and focuses the first light beams on a first focusing plane. The second optical element is disposed between the first focusing plane and a target area, receives the first light beams, deflects the first light beams to generate multiple second light beams, focuses the second light beams on a second focusing plane, and projects the second light beams to focus on the target area.

12 Claims, 8 Drawing Sheets

IMAGE DISPLAY DEVICE

BACKGROUND

Technical Field

The invention relates to an image display device, and particularly relates to an image display device that may reduce vergence accommodation conflict (VAC).

Description of Related Art

In the real world, a way that human eyes measure a distance is through cooperation of two sets of physiological reactions: vergence and accommodation. Eyeball vergence represents rotation of human eyes, and when looking at a close object, both eyes will simultaneously rotate toward the bridge of the nose. If the object is farther away, an angle of rotation will become smaller. Eyeball accommodation means scaling of a crystalline lens, where human eyes may automatically adjust a focus, and through force exertion/relaxation of a ciliary muscle, a curvature of the crystalline lens is changed to focus light emitted by an object on the retina.

However, in conventional augmented reality and virtual reality displays, binocular parallax is often used to create a three-dimensional sense for a user. A specifically calculated parallax image is received through the left and right eyes at the same time, thereby satisfying a vergence response. Such method cannot design different focusing planes for distant objects and near objects in the image, which means that any position in the image comes from the same focusing plane. Although this method results in correct response of the eyeball vergence to feel a distance of the object, since the image has only one focusing plane, the eyeball accommodation function will only focus on one position. Therefore, the two sets of physiological reactions will conflict, which may easily cause dizziness and nausea in some users, and such phenomenon is called vergence accommodation conflict.

SUMMARY

The invention provides an image display device, which may present both front and rear virtual images, so as to provide a better virtual and real integration experience.

The invention provides an image display device including a first optical element, a plurality of microlens arrays and a second optical element. The first optical element receives a display image and generates a plurality of image beams parallel to each other. The microlens arrays respectively receive the image beams, deflect the image beams to generate a plurality of first light beams, and focuses the first light beams on a first focusing plane. The second optical element is disposed between the first focusing plane and a target area, receives the first light beams, deflects the first light beams to generate a plurality of second light beams, focuses the second light beams on a second focusing plane, and projects the second light beams to focus on the target area.

Based on the above, the image display device of the invention uses the first optical element to focus the image beams on the first focusing plane for a first time, and uses the second optical element to focus the image beams on the second focusing plane for a second time to form a plurality of light point arrays to enter the human eye in multiple angles. When the human eye receives these image beams, it may focus the multiple image beams on the retina through the automatic accommodation function, and the brain may perceive a depth of the object in the image based on accommodation information, thereby creating the depth of the image and satisfying the accommodation function of the human eye, so as to reduce the discomfort that may be caused by convergence accommodation conflicts.

DESCRIPTION OF THE EMBODIMENTS

Figure 1A:
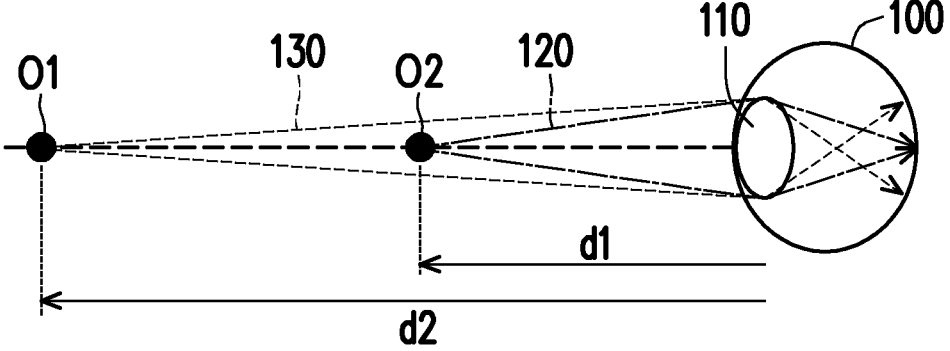
FIGS. 1A and 1B are schematic diagrams of how a human eye produce a sense of depth of an image.
Figure 1B:
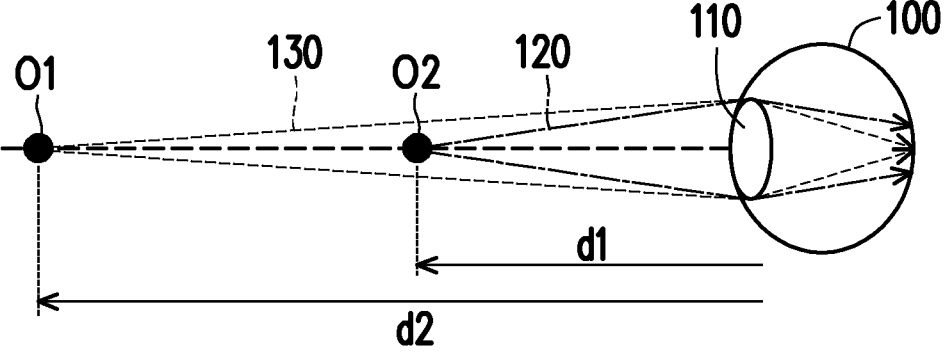

Referring to FIGS. 1A and 1B, FIGS. 1A and 1B are schematic diagrams of how a human eye produce a sense of depth of an image. A reason why the human eye may perceive depth is that in addition to binocular parallax, it may also obtain object distances through monocular accommodation. As shown in FIG. 1A and FIG. 1B, light rays emitted by objects O1 and O2 at different distances may enter the human eye 100 at different angles. An angle of a light ray 120 of the object O2 with a relatively close object distance d1 is greater than an angle of a light ray 130 of the object O1 with a relatively far object distance d2. Therefore, in FIG. 1B, when the human eye 100 focuses on a near object (object O2), a ciliary muscle will compress a crystalline lens 100, so that the large-angle light ray 120 may be focused on the retina. On the contrary, in FIG. 1A, when the human eye 100 focuses on a distant object (object O1), the crystalline lens 110 is relaxed, so that the small-angle light ray 130 is focused on the retina. According to an angle difference of the incident light rays, the human eye 100 may automatically adjust to focus the light ray on the retina, thereby creating a sense of image depth.

Figure 2A:
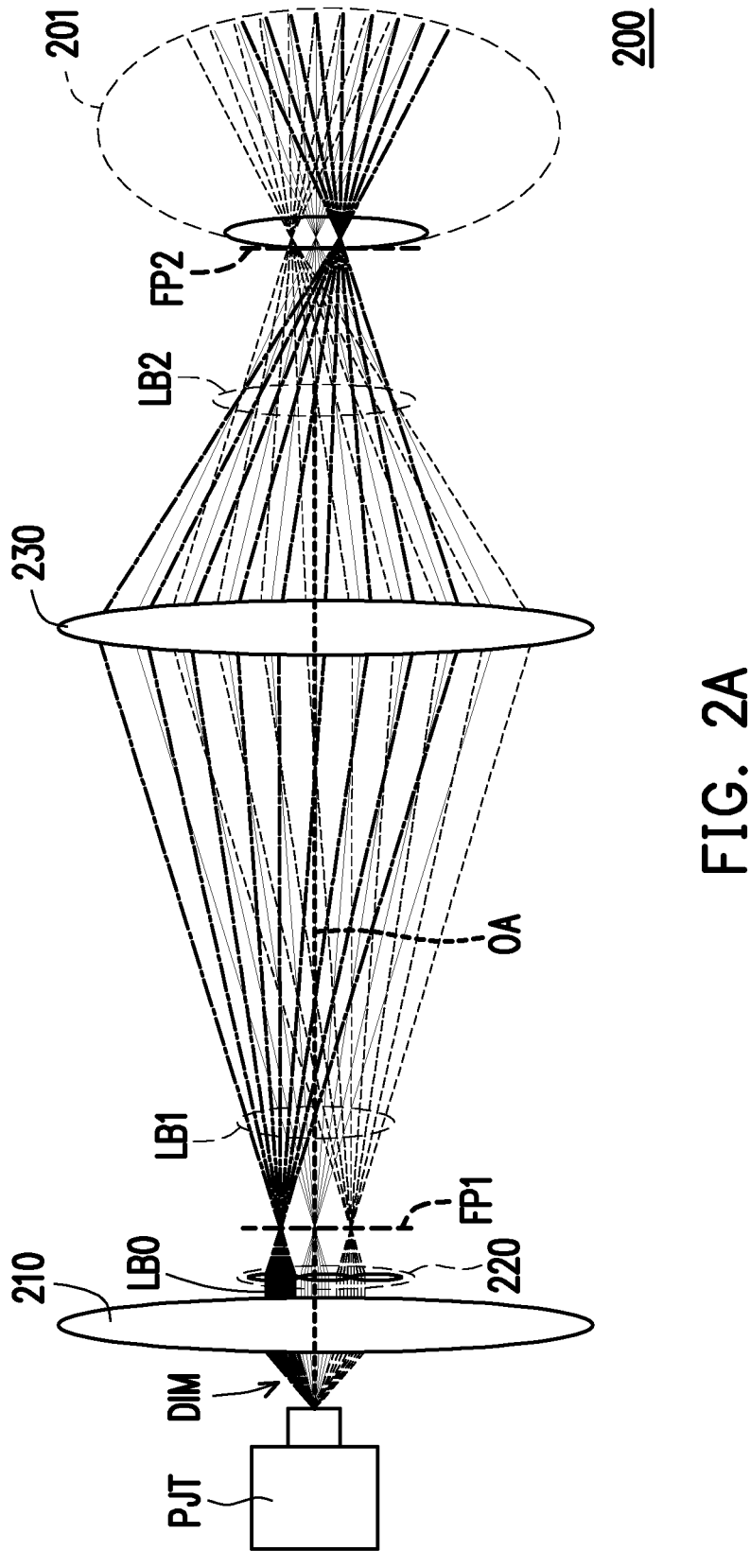
FIG. 2A is a schematic diagram of an image display device according to an embodiment of the invention.

Referring to FIG. 2A below, FIG. 2A is a schematic diagram of an image display device according to an embodiment of the invention. The image display device 200 includes a first optical element 210, a plurality of microlens arrays 220 and a second optical element 230. In the embodiment, the first optical element 210 is disposed in front of a lens of an image projector PJT, and is configured to receive a display image DIM emitted by the image projector PJT. The display image DIM may have multiple scattered image beams. The first optical element 210 generates a plurality of image beams LB0 parallel to each other by refracting the received display image DIM. In the embodiment, the first optical element 210 may be a collimated lens. In the embodiment, the image beams LB0 may be transmitted along an optical axis OA.

Figure 2B:
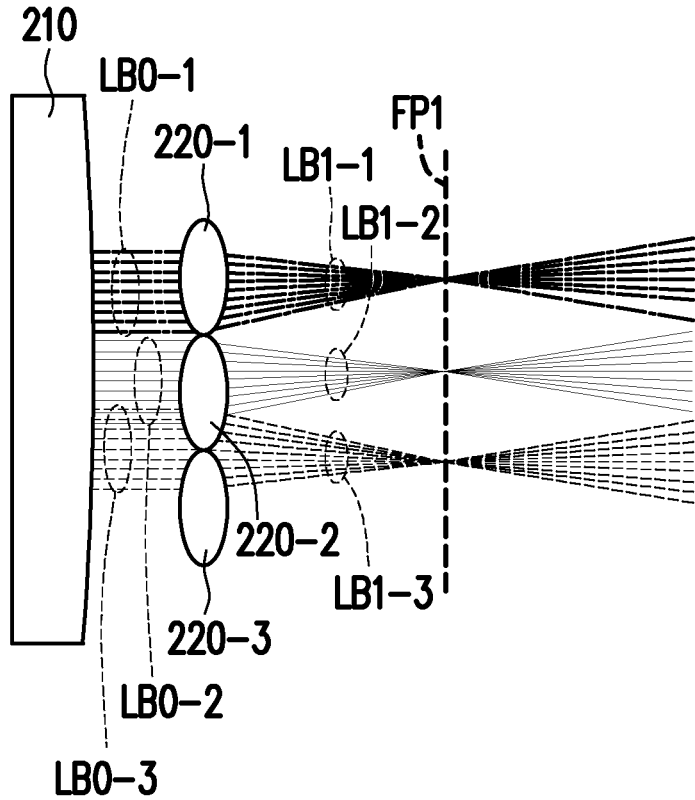
FIG. 2B is a partial enlarged schematic diagram of an image display device 200.

Referring to a partial enlarged schematic diagram of the image display device 200 shown in FIG. 2B below at the same time. The microlens arrays 220 include microlens arrays 220-1, 220-2 and 220-3, and the plurality of image beams LB0 are respectively image beams LB0-1, LB0-2 and LB0-3. The microlens arrays 220-1, 220-2 and 220-3 respectively receive the plurality of image beams LB0-1, LB0-2 and LB0-3. The microlens arrays 220-1, 220-2 and 220-3 respectively generate a plurality of first light beams LB1-1, LB1-2 and LB1-3 by deflecting the image beams LB0-1, LB0-2 and LB0-3. 3, and focus the first light beams LB1-1, LB1-2 and LB1-3 on a first focusing plane FP1.

Referring to FIG. 2A again, the plurality of first light beams LB1 (including the first light beams LB1-1, LB1-2 and LB1-3) pass through the first focusing plane FP1 and are transmitted to the second optical element 230. The second optical element 230 is disposed between the first focusing plane FP1 and a target area where a human eyeball 201 is located. In the embodiment, the second optical element 230 may be a focusing lens group and is disposed on the optical axis OA. The second optical element 230 receives the first light beams LB1, and deflects the first light beams LB1 to generate a plurality of second light beams LB2, and focuses the second light beams LB2 on a second focusing plane FP2. After passing through the second focusing plane FP2, the second light beams LB2 are projected to the target area where the human eyeball 201 is located.

Here, the second optical element 230 may be composed of one or a plurality of lenses and form the focusing lens group with a focusing capability. The second optical element 230 shown in FIG. 2A is a biconvex lens, which is only an example. In other embodiments of the invention, the second optical element 230 may also be a concavo-convex lens or a plano-convex lens.

It should be noted that the second light beams LB2 may form a light point array on the second focusing plane FP2, where each light point corresponds to each microlens in the lens arrays 220. In the embodiment, referring to FIG. 2B, by controlling positions of the image beams LB0-1, LB0-2, and LB0-3 respectively projected onto the microlens arrays 220-1, 220-2, and 220-3, emission angles of the correspondingly generated first light beams LB1-1, LB1-2 and LB1-3 may be adjusted. Based on the description of FIG. 1A and FIG. 1B, human eyes may have different depth-of-field perceptions for the objects in the display image DIM.

Figure 2C:
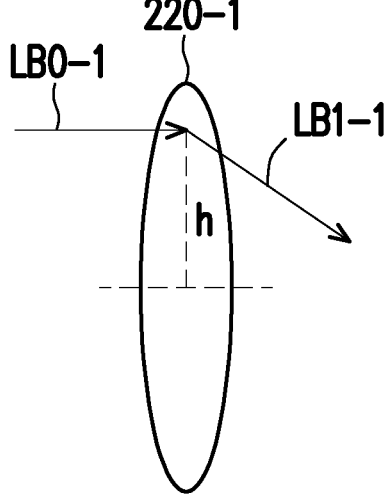
FIG. 2C a schematic diagram of a relationship between a microlens array and incident light.

In a schematic diagram of a relationship between the microlens array and the incident light shown in FIG. 2C, by adjusting a height h of the incident image beam LB0-1 on a cross section of the microlens array 220-1, the emission angle of the correspondingly generated first light beam LB1-1 may be adjusted. The higher an incident height of the image beam LB0-1 is, the larger the emission angle of the corresponding first light beam LB1-1 is.

It should be noted that a dimension of the microlens array 220 may be N times N, where N is an integer greater than or equal to 2.

Figure 3A:
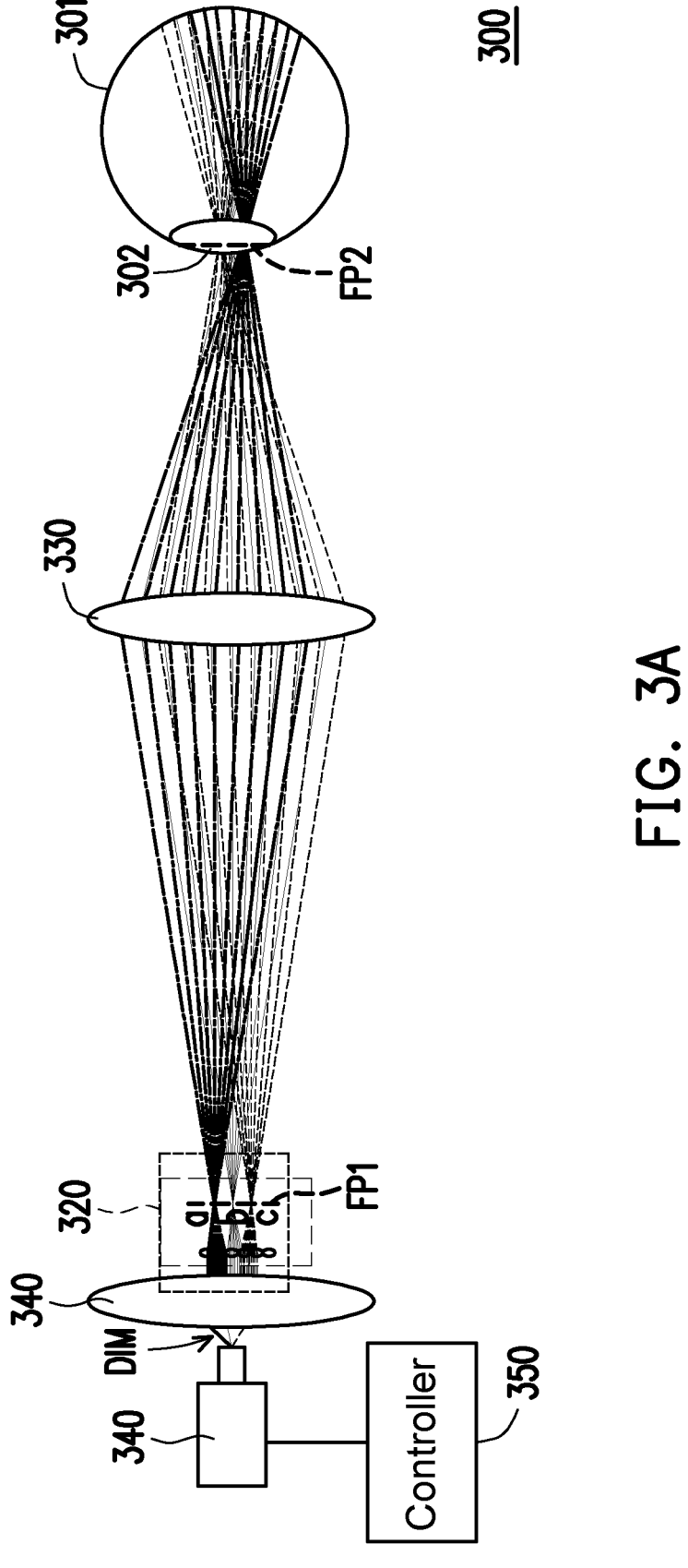
FIG. 3A is a schematic diagram of an image display device according to another embodiment of the invention.
Figure 3B:
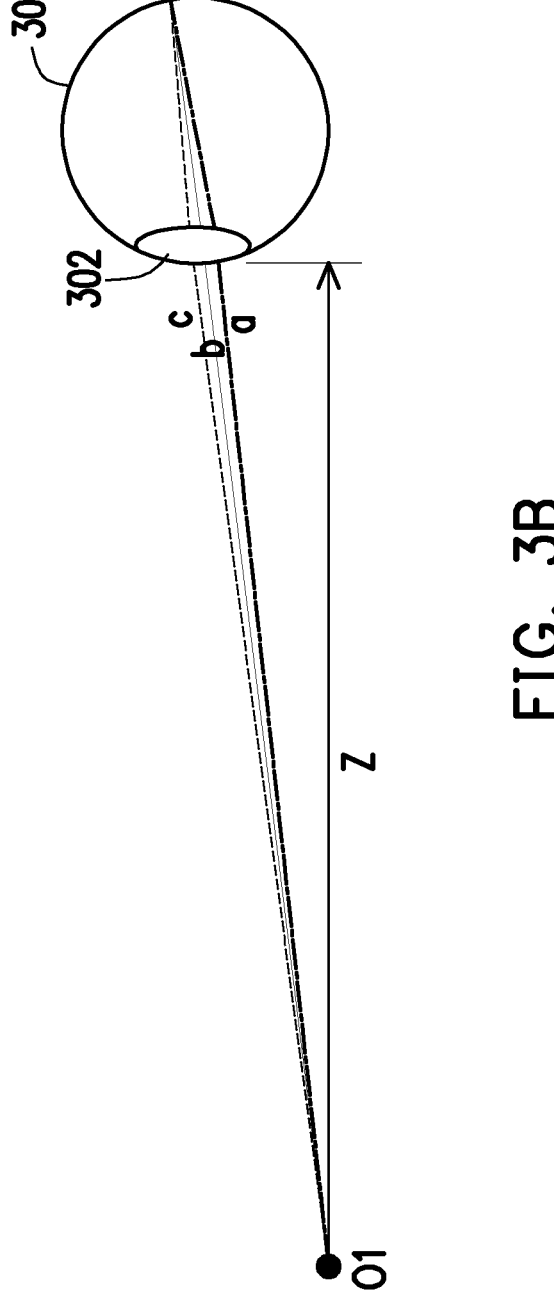
FIG. 3B is a schematic diagram of a human eye perceiving a depth of an image object in the embodiment of FIG. 3A.

Referring to FIG. 3A and FIG. 3B, FIG. 3A is a schematic diagram of an image display device according to another embodiment of the invention. FIG. 3B is a schematic diagram of the human eye perceiving a depth of an image object in the embodiment of FIG. 3A. In FIG. 3A, an image display device 300 includes a first optical element 310, a plurality of microlens arrays 320, a second optical element 330, an image projector 340 and a controller 350. The image projector 340 may be a projector or any other electronic device that may project a display image. The image projector 340 is configured to project the display image DIM toward the first optical element 310, where the display image DIM has a plurality of scattered image beams.

The first optical element 310 may be a collimating lens for receiving the display image DIM and deflecting the plurality of image beams of the display image to generate a plurality of first light beams parallel to each other. The microlens arrays 320 are arranged according to a light emission surface of the first optical element 310, and are configured to receive the plurality of first light beams provided by the first optical element 310. The plurality of first light beams are respectively projected to setting position of the corresponding microlens arrays 320, and the microlens arrays 320 deflect the plurality of first light beams to generate a plurality of second light beams a, b, and c respectively.

In the embodiment, the second light beams a, b and c are respectively focused on the first focusing plane FP1 with the corresponding plurality of second light beams. Then, after passing through the first focusing plane FP1, the second light beams a, b, and c are transmitted to the second optical element 330. The second optical element 330 deflects propagating paths of the second light beams a, b, and c, and focuses the second light beams a, b, and c and the corresponding second light beams on the second focusing plane FP2. Then, the light beams a, b and c are transmitted to a user's eyeball 301. Furthermore, the user's eyeball 301 may adjust a focal length of a crystalline lens 302 to project the second light beams a, b, and c onto the retina to generate an image.

Referring to FIG. 3B, after the user's eyeball 301 receives the second light beams a, b and c, the user's brain may perceive a depth Z of the object O1 based on the accommodation information of the crystalline lens 302, thereby creating an image depth to meet the accommodation function of the human eye.

In the embodiment, when performing an image projection operation, the controller 350 may calculate a light vector of a light point array formed by the light emitted by the object O1 with the depth Z and reaching the second focusing plane FP2, and deduce backwards a light angle of the display image DIM projected by the image projector 340, thereby generating light of a specific angle for projecting to the user's eyeball 301, and allowing the user to feel a depth of field of the object O1.

In the embodiment, the controller 350 may be a processor with a computing capability. Alternatively, the controller 350 may be a hardware circuit designed by using the hardware description language (HDL) or any other digital circuit design method well known to those of ordinary skill in the art, and implemented through a field programmable gate array (FPGA), a complex programmable logic device (CPLD) or an application-specific integrated circuit (ASIC).

Figure 4:
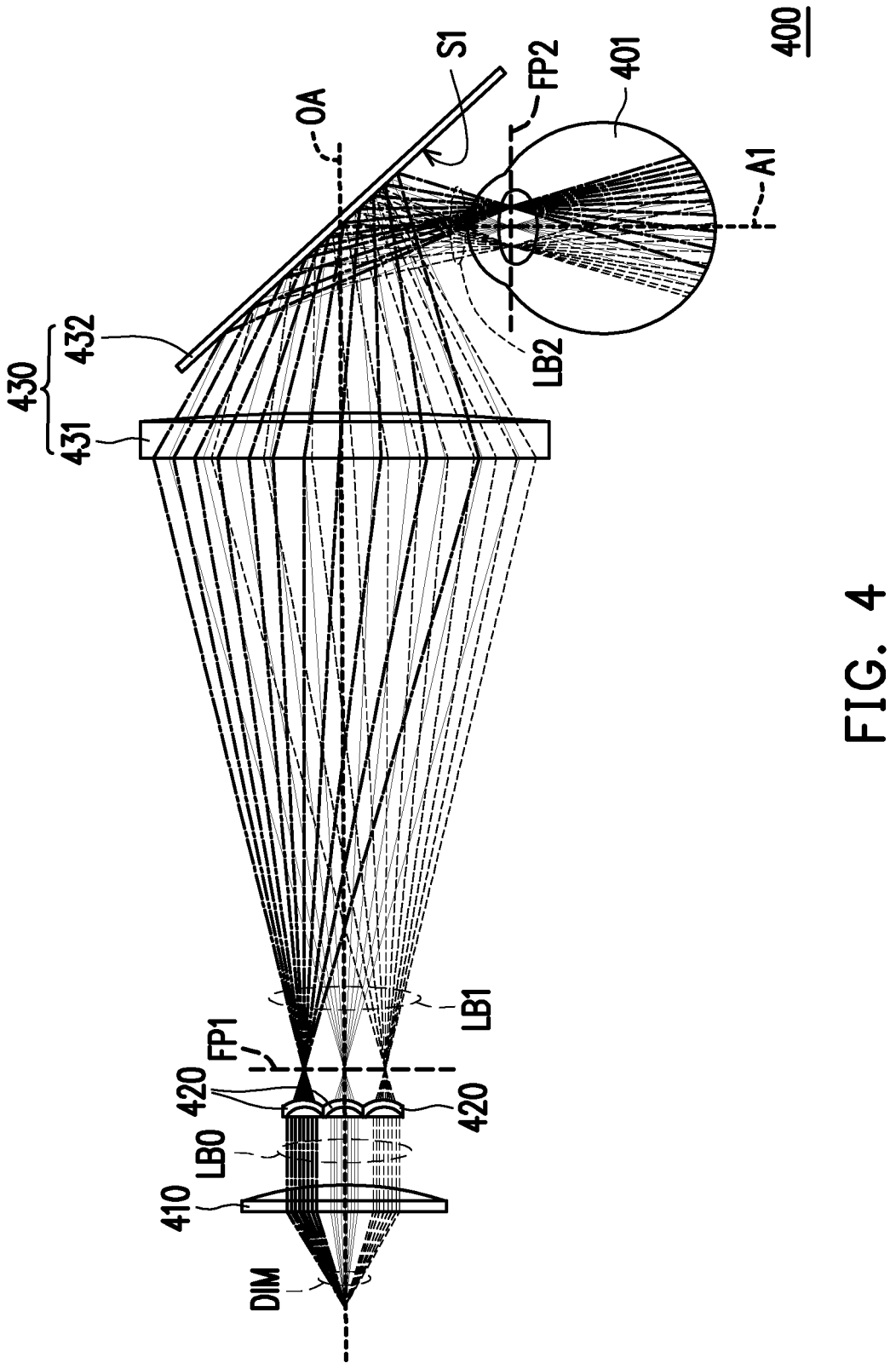
FIG. 4 is a schematic diagram of an image display device according to another embodiment of the invention.

Referring to FIG. 4 below, FIG. 4 is a schematic diagram of an image display device according to another embodiment of the invention. An image display device 400 includes a first optical element 410, a plurality of microlens arrays 420 and a second optical element 430. The first optical element 410 receives the display image DIM transmitted along the optical axis OA, and generates a plurality of image beams LB0 parallel to each other. The microlens arrays 420 respectively receive the plurality of image beams LB0, and deflect the image beams LB0 to generate a plurality of first light beams LB1. The plurality of first light beams LB1 are first focused on a focusing plane FP1 and are transmitted to the second optical element 430 after passing through the focusing plane FP1.

In the embodiment, the second optical element 430 includes a focusing lens group 431 and a reflector 412. The focusing lens group 431 may be a concavo-convex lens, and may have a focusing effect on the first light beams LB1. The focusing lens group 431 and the reflector 412 may be arranged according to the optical axis OA, for example, with center points on the optical axis OA, where the focusing lens group 431 may be arranged between the reflector 412 and the microlens arrays 420. The focused first light beams LB1 may be projected onto a reflecting surface S1 of the reflector 412. The reflector 412 reflects the first light beams LB1 to generate a plurality of second light beams LB2. The second light beams LB2 remain in a focused state and are focused on the second focusing plane FP2. Through the second focusing plane FP2, the second light beams LB2 may be projected into a user's eyeball 401 (i.e., the target area).

In the embodiment, the user's eyeball 401 does not need to be positioned on the optical axis OA. An included angle greater than 0 and less than 180 degrees may be formed between a connection line (for example, the optical axis OA) of the focusing lens group 431 and a center point of the reflector 432 and a connection line A1 of the reflector 432 and a center point of the target area.

Figure 5:
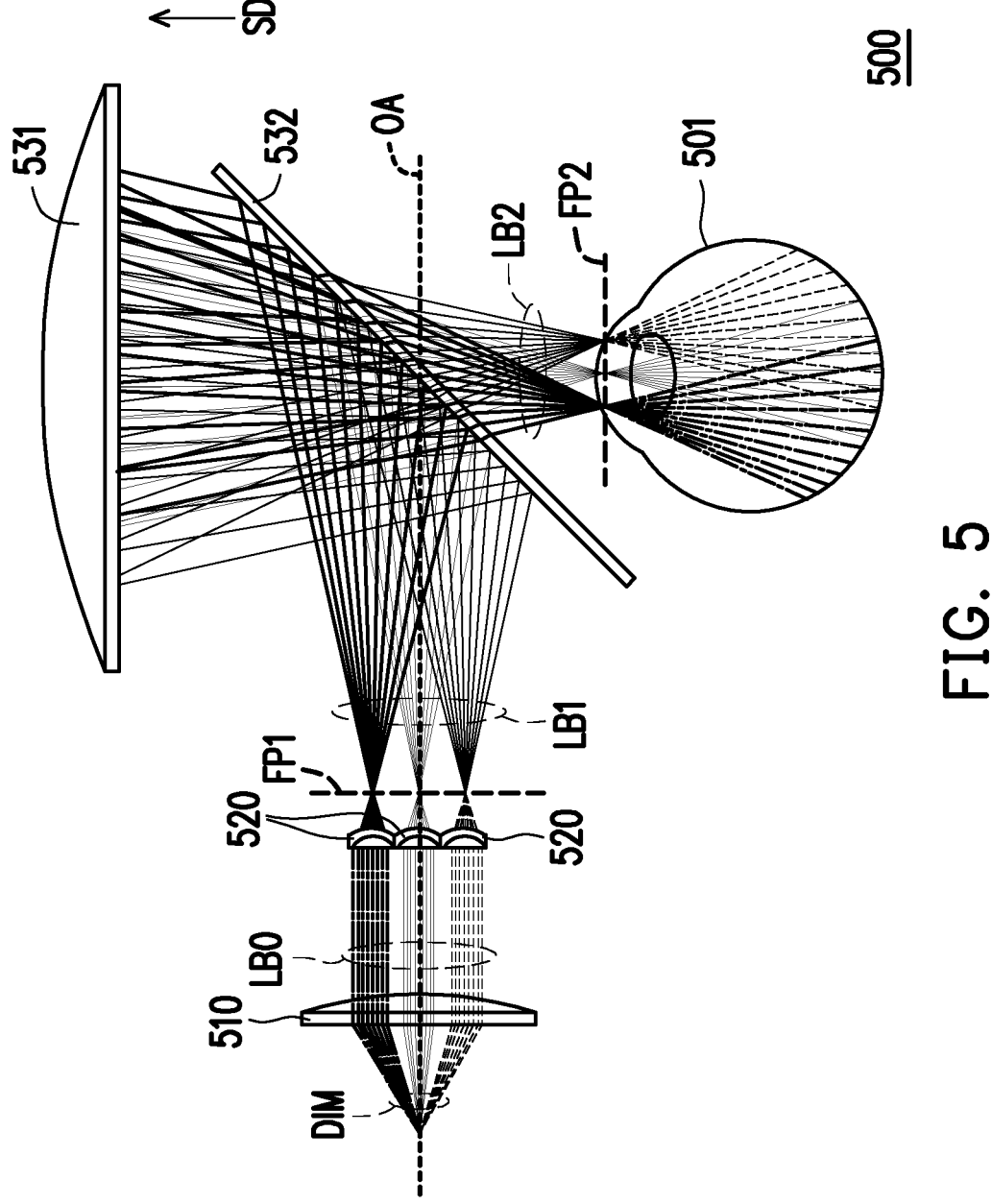
FIG. 5 is a schematic diagram of an image display device according to another embodiment of the invention.

Referring to FIG. 5 below, FIG. 5 is a schematic diagram of an image display device according to another embodiment of the invention. An image display device 500 includes a first optical element 510, a plurality of microlens arrays 520 and a second optical element 530. The first optical element 510 receives the display image DIM transmitted along the optical axis OA, and generates a plurality of image beams LB0 parallel to each other. The microlens arrays 520 respectively receive the plurality of image beams LB0, and deflect the image beams LB0 to generate a plurality of first light beams LB1. The plurality of first light beams LB1 are first focused on the focusing plane FP1 and are transmitted to the second optical element 530 after passing through the focusing plane FP1.

The second optical element 530 includes a beam splitter 532 and a concave mirror 531. In the embodiment, the beam splitter 532 may be disposed on the optical axis OA. The beam splitter 532 receives the first light beams LB1 and reflects the first light beams LB1 toward a setting direction SD to the concave mirror 531. The concave mirror 531 is configured to reflect and deflect the first light beams LB1 to bring the first light beam LB1 into a focused state. The first light beams LB1 in the focused state may transmit through the beam splitter 532 to generate second light beams LB2. The second light beams LB2 may be focused on the second focusing plane FP2 and further transmitted to a user's eyeball 501.

In the embodiment, an included angle between the optical axis OA and the setting direction SD may be greater than 0 and less than 180 degrees.

Figure 6:
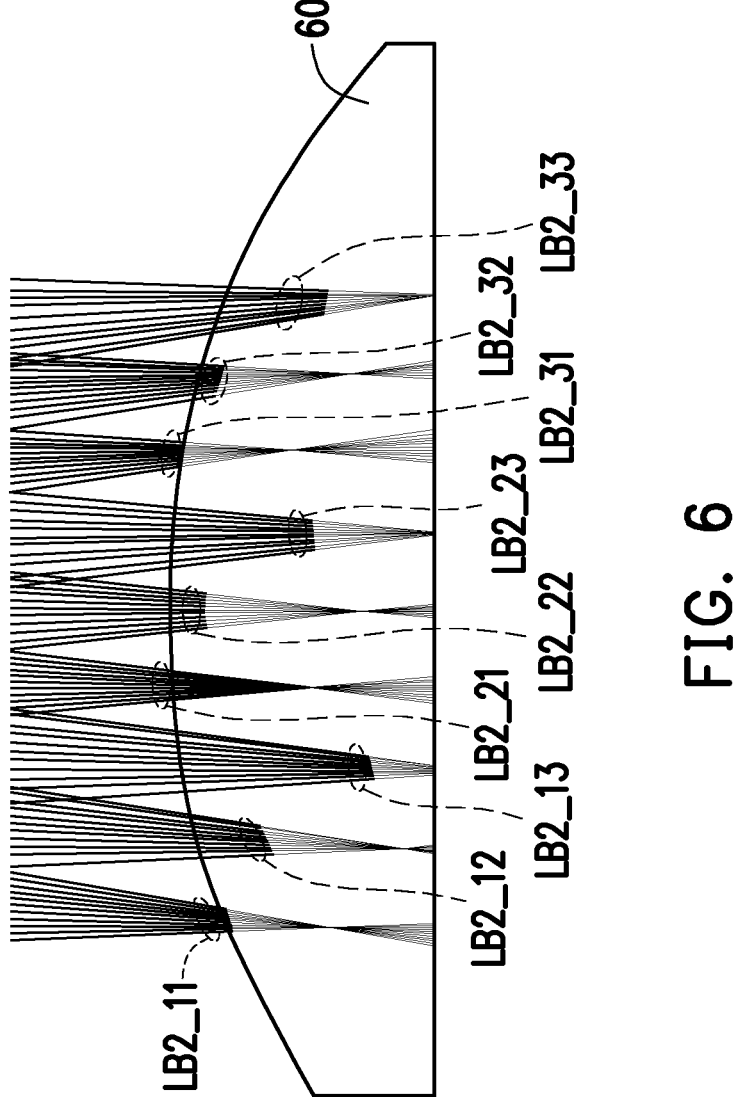
FIG. 6 is a schematic diagram of a plurality of light spots formed on a second focusing plane by an image display device according to an embodiment of the invention.

Referring to FIG. 6, FIG. 6 is a schematic diagram of a plurality of light spots formed on the second focusing plane by the image display device according to an embodiment of the invention. In the embodiment, the plurality of second light beams LB2_11-LB2_33 may form a 3×3 array and enter a user's eyeball 601. The second light beams LB2_11-LB2_33 are respectively focused to form a 3×3 light spot array, and each light spot may correspond to each microlens in the microlens array.

In summary, the image display device of the invention focuses the image beams on the first focusing plane for a first time by deflecting the image beams, and focuses the image beams on the second focusing plane for a second time to form a plurality of light point arrays, such that the image beams enter the human eye in multiple angles. The human eye produces different depth of field effects for different objects, so as to reduce the discomfort that may be caused by convergence accommodation conflicts.

What is claimed is:

1. An image display device, comprising:
a first optical element receiving a display image, and generating a plurality of image beams parallel to each other;
a plurality of microlens arrays respectively receiving the image beams, deflecting the image beams to generate a plurality of first light beams, and focusing the first light beams on a first focusing plane; and
a second optical element disposed between the first focusing plane and a target area, receiving the first light beams, deflecting the first light beams to generate a plurality of second light beams, focusing the second light beams on a second focusing plane, and projecting the second light beams to the target area.

2. The image display device according to claim 1, wherein the first optical element is a collimating lens.

3. The image display device according to claim 1, wherein the image beams are transmitted along an optical axis, and the second optical element comprises a focusing lens group disposed on the optical axis.

4. The image display device according to claim 3, wherein the focusing lens group comprises a biconvex lens, a plano-convex lens or a concavo-convex lens.

5. The image display device according to claim 3, wherein the second optical element further comprises:
a reflector disposed on the optical axis, wherein the focusing lens group is between the reflector and the microlens arrays, and the reflector reflects the second light beams and focuses the second light beams on the second focusing plane.

6. The image display device according to claim 5, wherein an included angle greater than 0 and less than 180 degrees is formed between a connection line of the focusing lens group and a center point of the reflector and a connection line of the reflector and a center point of the target area.

7. The image display device according to claim 3, wherein the second optical element comprises:
a beam splitter disposed on the optical axis to reflect the first light beams in a setting direction; and
a concave mirror disposed in the setting direction, receiving the first light beams, generating the second light beams by reflecting the first light beams, and causing the second light beams to pass through the beam splitter and focus on the second focusing plane.

8. The image display device according to claim 7, wherein the second optical element comprises:
a lens group disposed between the beam splitter and the microlens arrays.

9. The image display device according to claim 7, wherein an included angle between the optical axis and the setting direction is greater than 0 and less than 180 degrees.

10. The image display device according to claim 1, further comprising:
an image projector configured to project the image beams of the image beam.

11. The image display device according to claim 10, further comprising:
a controller coupled to the image projector, and adjusting a depth of field of a corresponding displayed object of each of the image beams by adjusting a position of each of the image beams projected on each of the microlens arrays.

12. The image display device according to claim 1, wherein each of the microlens array is composed of N times N microlenses, wherein N is an integer greater than or equal to 2.

\* \* \* \* \*